(12) United States Patent
van Doorn et al.

(10) Patent No.: US 11,025,698 B2
(45) Date of Patent: \*Jun. 1, 2021

(54) SYSTEM AND METHOD FOR DATA STREAM FRAGMENTATION WITH SCALABILITY

(71) Applicant: Comcast Cable Communications, LLC, Philadelphia, PA (US)

(72) Inventors: Jan van Doorn, Castle Rock, CO (US); Brian Field, Evergreen, CO (US)

(73) Assignee: Comcast Cable Communications, LLC, Philadelphia, PA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/447,962

(22) Filed: Mar. 2, 2017

(65) Prior Publication Data

US 2018/0027043 A1    Jan. 25, 2018

Related U.S. Application Data

(63) Continuation of application No. 13/362,766, filed on Jan. 31, 2012, now Pat. No. 9,648,072.

(51) Int. Cl.
*H04L 29/06* (2006.01)
*H04N 21/2343* (2011.01)
(Continued)

(52) U.S. Cl.
CPC ............ *H04L 65/607* (2013.01); *G06F 15/16* (2013.01); *H04N 21/235* (2013.01);
(Continued)

(58) Field of Classification Search
CPC .................. G06F 15/16; H04L 65/607; H04N 21/234309; H04N 21/235; H04N 21/435;
(Continued)

(56) References Cited

U.S. PATENT DOCUMENTS 5,999,216 A    12/1999  Kaars
6,373,856 B1 \*  4/2002  Higashida ........... H04L 12/5601
                                                  370/395.65
(Continued)

FOREIGN PATENT DOCUMENTS

CA         2803759         1/2013
CA         2803759 A1      7/2013
(Continued)

OTHER PUBLICATIONS

Extended European Search Report dated Jul. 26, 2017 by the European Patent Office for EP Application No. 13157648.0, which was filed on Mar. 4, 2013 and published as EP2624523A2 on Aug. 7, 2013 (Applicant—Comcast Cable Communications, LLC.) (11 pages).

*Primary Examiner* — Thomas J Dailey
(74) *Attorney, Agent, or Firm* — Ballard Spahr LLP

(57) ABSTRACT

A method of data conditioning is disclosed that in one aspect can include the steps of receiving a data stream, encoding a time code in the data stream to identify a portion of the data stream corresponding to a content fragment, and separating the identified portion of the data stream to define the content fragment, wherein the content fragment comprises the encoded time code.

24 Claims, 5 Drawing Sheets

(51) Int. Cl.
  *H04N 21/235* (2011.01)
  *H04N 21/435* (2011.01)
  *H04N 21/845* (2011.01)
  *H04N 21/858* (2011.01)
  *G06F 15/16* (2006.01)

(52) U.S. Cl.
  CPC ... *H04N 21/234309* (2013.01); *H04N 21/435* (2013.01); *H04N 21/8455* (2013.01); *H04N 21/8456* (2013.01); *H04N 21/8586* (2013.01)

(58) Field of Classification Search
  CPC .......... H04N 21/8455; H04N 21/8456; H04N 21/8586
  See application file for complete search history.

(56) References Cited

U.S. PATENT DOCUMENTS

| | | | |
|---|---|---|---|
| 6,738,427 B2 | 5/2004 | Zetts | |
| 6,829,781 B1 | 12/2004 | Bhagavath et al. | |
| 7,197,758 B1 | 3/2007 | Blackketter et al. | |
| 7,715,475 B1 | 5/2010 | Puri et al. | |
| 9,386,066 B2 | 7/2016 | Jarvinen et al. | |
| 9,648,072 B2 | 5/2017 | van Doorn et al. | |
| 2002/0034255 A1 | 3/2002 | Zetts | |
| 2003/0091000 A1 | 5/2003 | Chu et al. | |
| 2004/0190855 A1 | 9/2004 | Poslinski | |
| 2005/0076390 A1* | 4/2005 | Klausberger | H04N 21/23109 725/134 |
| 2005/0091280 A1 | 4/2005 | Winter | |
| 2005/0190911 A1 | 9/2005 | Pare et al. | |
| 2006/0129909 A1 | 6/2006 | Butt et al. | |
| 2006/0233143 A1 | 10/2006 | Walker et al. | |
| 2007/0040933 A1 | 2/2007 | Seong | |
| 2007/0186247 A1 | 8/2007 | White et al. | |
| 2010/0011392 A1 | 1/2010 | Bronstein et al. | |
| 2010/0180043 A1 | 7/2010 | Lau et al. | |
| 2010/0235528 A1 | 9/2010 | Bocharov et al. | |
| 2011/0080940 A1 | 4/2011 | Bocharov et al. | |
| 2011/0125919 A1 | 5/2011 | Kwon et al. | |
| 2012/0246279 A1* | 9/2012 | Zang | H04L 65/4076 709/219 |
| 2013/0042015 A1 | 2/2013 | Begen et al. | |
| 2013/0198401 A1 | 8/2013 | van Doorn et al. | |

FOREIGN PATENT DOCUMENTS

| | | |
|---|---|---|
| EP | 2387241 A1 | 5/2011 |
| WO | WO-99/037072 | 7/1999 |
| WO | WO-2010/039838 A1 | 4/2010 |

* cited by examiner

SYSTEM AND METHOD FOR DATA STREAM FRAGMENTATION WITH SCALABILITY

CROSS REFERENCE TO RELATED APPLICATION

This application is a Continuation of U.S. Non-Provisional application Ser. No. 13/362,766, filed on Jan. 31, 2012, which is herein incorporated by reference in its entirety.

BACKGROUND

Data streaming or media streaming is a technique for transferring data so that the data can be processed in a steady and continuous manner. Streaming technologies are becoming increasingly important with the growth of the Internet because sufficient bandwidth is needed to download large multimedia files quickly. Streaming involves transmitting media that would normally be stored in a large file, such as video, in smaller portions such that while a consumer is watching early portions of the video, the later portions are downloaded and queued for viewing.

Adaptive streaming is a process that adjusts the quality of a data stream delivered to an end-user to attempt to provide the best possible experience (e.g., viewing video, listening to audio, and the like). Adaptive streaming provides an improved streaming media experience because the delivery of the data stream changes in response to changing conditions of the user's network.

Adaptive streaming delivers streaming content to users by dynamically switching among different streams of varying quality and size during playback. For example, an adaptive streaming system might have many versions of the same content all processed at different quality levels. Higher quality content, such as full-resolution, high-definition video, might require a large amount of bandwidth to deliver enough video to support streaming. Lower quality content, however, might require less bandwidth to support streaming. An adaptive streaming system can send (and switch between) higher and lower quality content based on, for example, the available bandwidth at any given moment, or the processing power of the device on which the end user is viewing the video. This provides users with the best possible viewing experience at any given time.

To manage and deliver large data files in a streaming environment, an adaptive data stream may be divided into fragments, each a few seconds long. The fragments can be delivered and then coupled together to form the complete content, such as a video. Adaptive streaming can leverage fragments by swapping in and out fragments of varying quality depending on the operating environment.

To keep track of available quality levels and fragments, conventional adaptive streams can include a manifest, such as a text or XML file that contains information about the available quality levels and fragments and the network location of the fragment. Client devices can use the manifest to gather information about the fragments, and can then load the video fragments in the best possible quality that is available at that point in time.

In a conventional fragmented video paradigm, the fragmented video objects or content fragments are stored in Content Delivery Networks (CDNs). From the CDN, the video fragment can be delivered to numerous edge devices. This disclosure identifies and addresses, among other things, an issue where if a CDN solution is to scale to serve potentially millions of devices, the system must support redundancy and site diversity at all levels. In conventional systems, fragmentation functionality is performed at diverse locations across multiple independent devices. The diversity of location and devices can cause errors in content delivery because, for example, content fragments created by different devices are not interchangeable.

SUMMARY

It is to be understood that both the following general description and the following detailed description are exemplary and explanatory only and are not restrictive, as claimed. In an aspect, provided are methods and systems for data stream fragmentation with scalability, wherein the content fragments that refer to the same data chunk (e.g., fixed duration linear video) are referenced via identical names or identifiers (e.g., URLs). Accordingly, fragmentors operating in different locations can create identical content fragments (e.g., in terms of video content contained).

In another aspect, the system and methods for data stream fragmentation provide traceability information (e.g., a genealogy of the content) in each of the content fragments to operate, troubleshoot and identify the genealogy of a particular one of the content fragments through the CDN back to an origin, a fragmentor, and/or a transcoder.

In an aspect, a data fragmentation system can comprise an encoder configured to receive a data stream and to encode a time code in the data stream to identify a content fragment. A fragmentor can be in signal communication with the encoder and configured to receive the data stream therefrom. The fragmentor can be further configured to construct the content fragment based upon the time code encoded in the data stream.

The present disclosure also describes exemplary methods of data conditioning (e.g., including encoding and/or fragmenting). One method can comprise the steps of receiving a data stream, encoding a time code in the data stream to identify a portion of the data stream corresponding to a content fragment, separating the identified portion of the data stream to define the content fragment, wherein the content fragment comprises the encoded time code.

Another method can compromise the steps of receiving a request for one of a plurality of content fragments, wherein each of the plurality of content fragments comprises a respective time code and the request includes a requested time code, selecting one of the plurality of content fragments in response to the request, and transmitting the selected one of the plurality content fragments.

Additional embodiments and advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
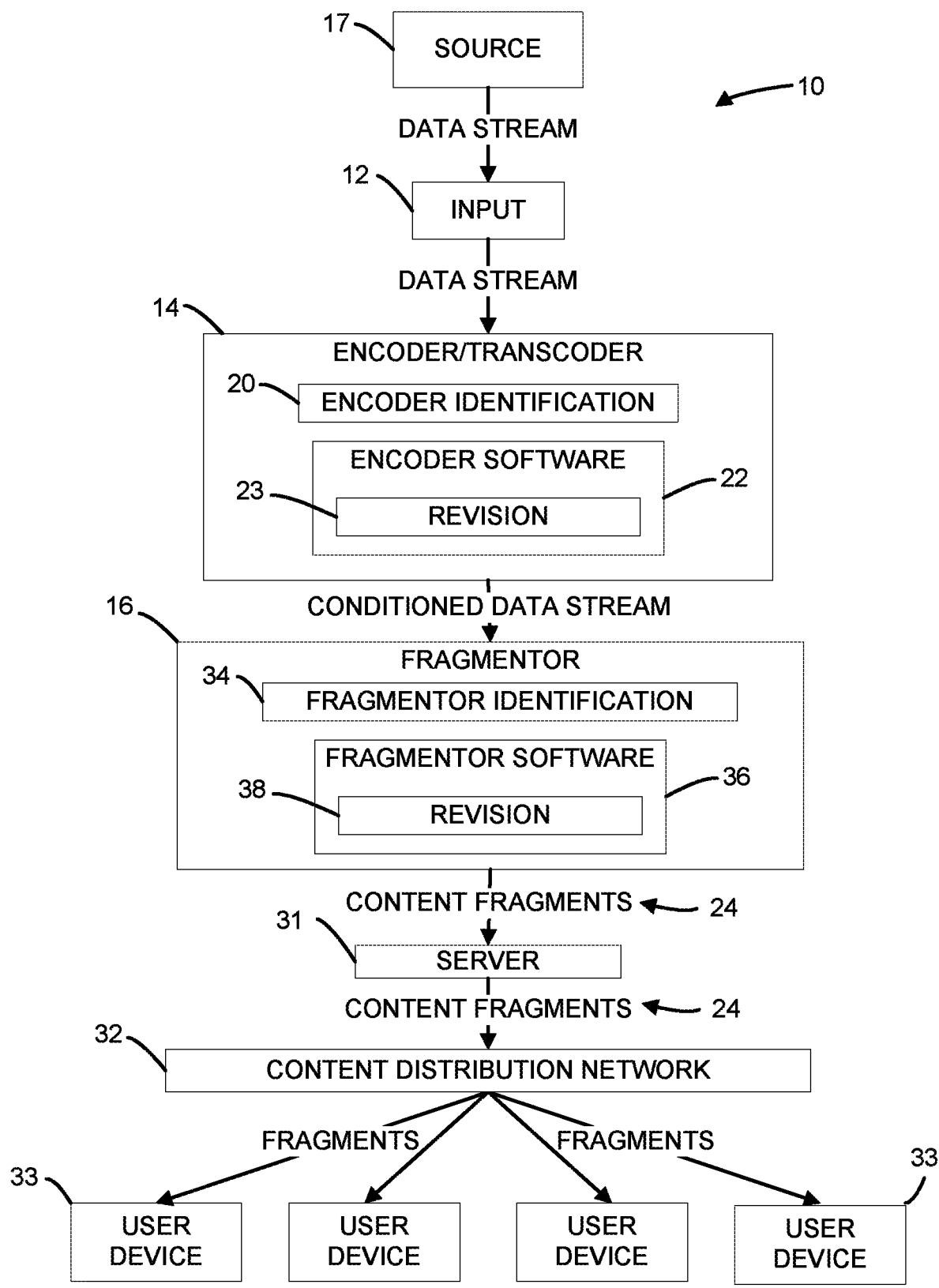
FIG. 1 is a block diagram of an exemplary data stream fragmentation network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in more detail below, a system for processing a data stream can comprise an encoder/transcoder to condition fragments of the data stream and/or encode information relating to each of the fragments for down stream processing of the fragments.

FIG. 1 illustrates various aspects of an exemplary network and system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

FIG. 1 is a block diagram of a data stream fragmentation network and system 10. As shown, the system 10 can comprise an input 12 for receiving a data stream, an encoder 14 in signal communication with the input 12, and a fragmentor 16 in signal communication with the encoder 14. It is understood that the network and system 10 can include other components such as processors, routers, network devices and the like.

The input 12 can be any device, system, apparatus, or the like to provide a signal communication between a data source 17 and the encoder 14 and to transmit the data stream to the encoder 14 for signal processing/conditioning. In an aspect, the data source 17 is a content provider that provides content such as, but not limited to, data, audio content, video content, news, and sports that can be made available to various end-users. As an example, the data stream can comprise a service identification 18 (shown in FIG. 2) that represents information about the content represented by the data stream. By way of example, the service identification 18 can be a predefined alphanumeric identifier such as CNN and ESPN. In an aspect, the data source 17 can transmit or allow access to the data stream in a standard format (e.g. MPEG-4 or a single MPEG-4 video encapsulated in an MPEG-2 transport stream over UDP MCAST). However, the encoder 14 can receive the data stream from any source having any format.

The encoder 14 can be any device, system, apparatus, or the like to encode and/or transcode the data stream. In an aspect, the encoder 14 can convert a data stream input having a single bit rate (by way of example, high bit rate video), to an output of one or more data streams of other bitrates (by way of example, lower bit rate video). As an example, the encoder 14 can convert the data stream from the input format received from the data source to a transport format for distribution to consumers. In an aspect, the encoder 14 can comprise a device such as a transcoder that conditions streaming data and/or changes data from one format to another. In an aspect, the encoder 14 can comprise a separate encoder and transcoder for conditioning streaming data and/or changing the data from one format to another. As an example, the encoder 14 can receive or access the data stream from the input 12 and encodes/transcodes information onto the data stream. As a further example, the encoder 14 adds information to the stream relating to content fragments 24.

In an aspect, the encoder 14 can comprise an encoder identification (ID) 20. The encoder ID 20 can be a predefined alphanumeric identifier, an Internet protocol address, or other identifying information. As an example, the encoder 14 can comprise encoder software 22 for controlling an operation of the encoder 14, the encoder software having an identifiable software version or revision 23.

Figure 2:
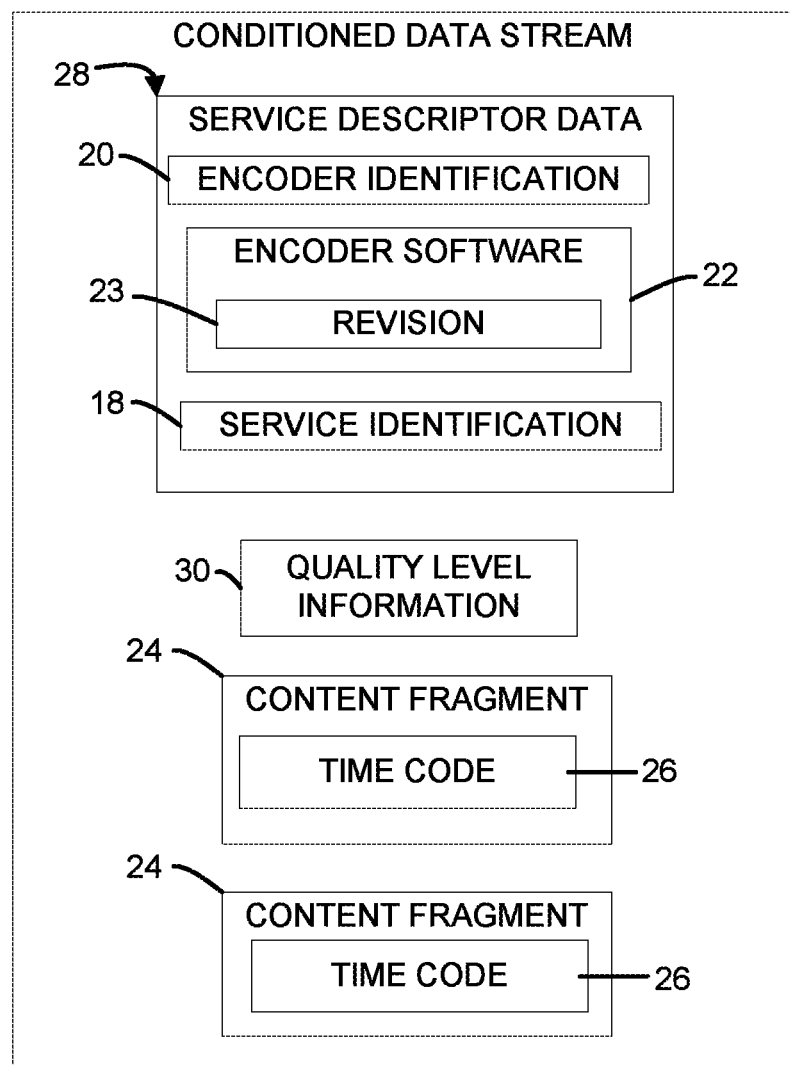
FIG. 2 is a block diagram of an exemplary conditioned data stream.

Turning now to FIG. 2, content fragments will be discussed in greater detail. As shown in FIG. 2, the exemplary data stream comprises content that can be divided into one or more content fragments 24. As an example, each of the content fragments 24 can comprise a bit rate and resolution. As a further example, the data stream can be an adaptive data stream and each of the content fragments 24 can have variable characteristics such as bit rate and resolution relative to each other.

In an aspect, the encoder 14 can be configured to insert/encode a fragment time code 26 into the data stream to identify each of the content fragments 24. As an example, the time code 26 can be encoded into private data of the data stream, such as, for example, the MPEG-2 transport stream. As a further example, the time code can be derived from a continuously increasing time scale or time standard (e.g., UNIX-based time). However, other timing scales and standards, now known or later developed, can be used, as can other systems of providing unique identifiers to data.

In an aspect, the time code 26 can be in Hundred Nano Seconds (HNS or 10,000,000 ticks per second) format. As an example, the UNIX time can be converted to HNS format. In an aspect, the actual time of Thursday, January 6 14:18:32 2011 has a Unix time value of 1294348712. The time code for a fragment created on that date can be 1294348712×10,000,000. The next fragment time code can be 1294348712×10,000,000+ duration of the content fragment 24 in presentation time stamp (PTS) units="1294348712*10,000,000+ "abcdefghi" (where "abcdefghi" is the PTS duration value for that fragment). If the time code 26 for the first one of the content fragments 24 is referred to as "time code x," then a time code for a second one of the content fragments 24 can be "time code x"+a duration of the second one of the content fragments 24 in PTS units. As an example, even though the PTS units reset (or wrap) every twenty-six hours, the use of UNIX time nevertheless ensures unique values for the time code.

In an aspect, downstream devices (e.g., fragmentors) can use the same time code values as established by the encoder 14, thereby allowing inter-fragmentor service and redundancy. In some systems, a name associated with each of the content fragments 24 is not standardized among various data feeds and must be modified when switching between feeds such as a live feed, a network digital recorder feed, and a video on demand feed, for example. However, the unique time codes provided by the exemplary encoder 14 can allow for a simpler network digital video recorder (NDVR) implementation, as time codes can always count forward. Accordingly, a changing of namespace when going from live or linear content to NDVR to video on demand (VOD) is not necessary. Further, when the fragmentor 16 (or other downstream device) restarts (hardware wise or software wise), or experiences another event that affects the fragmentor's internal systems, the timing mechanism can ensure that all devices (e.g., fragmentors) receiving the same content can nevertheless generate substantially similarly or commonly named fragments, because the time code associated with a particular one of the content fragments 24 is determined by the encoder 14, rather than the fragmentor 16.

In an aspect, the encoder 14 can be configured to insert service descriptor data 28, such as a Service Descriptor Table (SDT), in the data stream or information into in an existing SDT. As an example, the data stream can comprise an SDT and the encoder can "tag" or encode information (e.g., tracking information) into the existing SDT or some other data field. As a further example, the fragmentor 16 can be configured to tag and/or add information to the existing SDT or some other data field.

In an aspect, the SDT 28 can be information provided in a format such as a data table that describes the services that are part on an MPEG transport stream. The SDT 28 can include name of the service, service identifier, service status, and whether or not the service is scrambled. (See ETSI EN 300 468, hereby incorporated herein by reference in its entirety). In an aspect, the SDT 28 can include information such as service identification 18 (e.g., the provider of the content), the identity of the encoder that generated the stream 20, and the encoder software revision 23.

In an aspect the encoder 14 can be configured to insert the associated quality level information 30 in the data stream to identify characteristics of each of the content fragments 24, such as their resolution and bit rate. By way of example, the quality level information 30 can be encoded into the private data (e.g., MPEG-2 transport stream private data) of the data stream by the encoder 14 and can be subsequently extracted by the fragmentor 16. In an aspect, the quality level information 30 can be propagated to the fragmentor 16 (or other device or system such as a server 31) to generate manifest information and/or a name (e.g., URL) for the associated content fragment 24.

In an aspect, the encoder 14 can be configured to insert a horizon window 42 (FIG. 3) or information relating to sequential content fragments that are expected to follow the content fragment 24 that is being encoded/tagged. As an example, the horizon window 42 can comprise a next-in-time content fragment and/or sequence of subsequent content fragments. As a further example, the horizon window 42 can comprise information relating the various quality levels of the next in time fragment(s) so that a downstream device can selectively process the content fragments based upon a desired and/or optimal quality level. In an aspect, the horizon window 42 can represent/identify missing information or "potholes" for particular content fragments. For example, the horizon window 42 can have information for two consecutive next-in-time content fragments for all but the highest quality level. In use, a downstream device requesting the content fragment from the missing quality level may receive an error. Likewise, if a large number of downstream devices request the same missing content fragment, the network can be overloaded with error messages, thereby delaying processing and consuming bandwidth. However, the horizon window 42 can comprise information relating to each of the content fragments and the various quality levels and can identify if any of the content fragments associated with a particular quality level are missing. In this way, a downstream device can process the horizon window 42 to identify which fragments are available and which fragments are missing. Accordingly, the downstream device will not request a fragment that is identified as missing. Instead, the down stream device can be configured to request another suitable content fragment such as the content fragment associated with the next lower level of quality (or higher level quality).

Returning to FIG. 1, the fragmentor 16 can be in signal communication with the encoder 14 and receive the conditioned data stream therefrom. By way of example, the encoder 14 can transmit a plurality of MPEG-4 videos encapsulated in an MPEG-2 transport stream over UDP MCAST, however, other protocols and standards can be used. The fragmentor 16 can condition the data stream for downstream processing and distribution by a computing device such as server 31.

In an aspect, the fragmentor 16 can separate or fragment the data stream into content fragments 24 based upon information encoded onto the data stream by the encoder 14. As an example, the fragmentor 16 can be configured to access the information encoded/inserted in the data stream by the encoder 14 to define the content fragments 24 from the conditioned data stream. Once the content fragments 24 are generated, the content fragments 24 can be transmitted to a content distribution network (CDN) 32, or another intermediary or storage device, for delivery to a user device 33 or any client or consumer device for playback. In an aspect, the fragmentor 16 can then provide the content fragments to the server 31, which, as an example, can be an origin hypertext transfer protocol (HTTP) server. However, other servers can be used. The fragmentor 16 can transmit the content fragments to the server 31 using HTTP commands, such as the POST command. However, other network protocols and communication methods can be used.

The server 31 can then provide the content fragments 24 to the CDN 32 for distribution to users. By way of example, the CDN 32 can obtain content from the server 31 using an HTTP GET command, and the devices 33 can then obtain content from the CDN 32 using an HTTP GET command. However, other network protocols and communication methods can be used to provide the network communications and file transfers between the various portions of the system. As an example, the use of push and/or pull data transfer model is merely an implementation detail, and any mechanism for the transfer of data over a network can be used.

As described in further detail below, the fragmentor 16 can include a fragmentor identification 34, such as a predefined alphanumeric identifier, an Internet protocol address, or other identifying information. The fragmentor 16 can also include fragmentor software 36 for controlling an operation of the fragmentor 16, the fragmentor software 36 having an identifiable software versions or revision 38.

Figure 3:
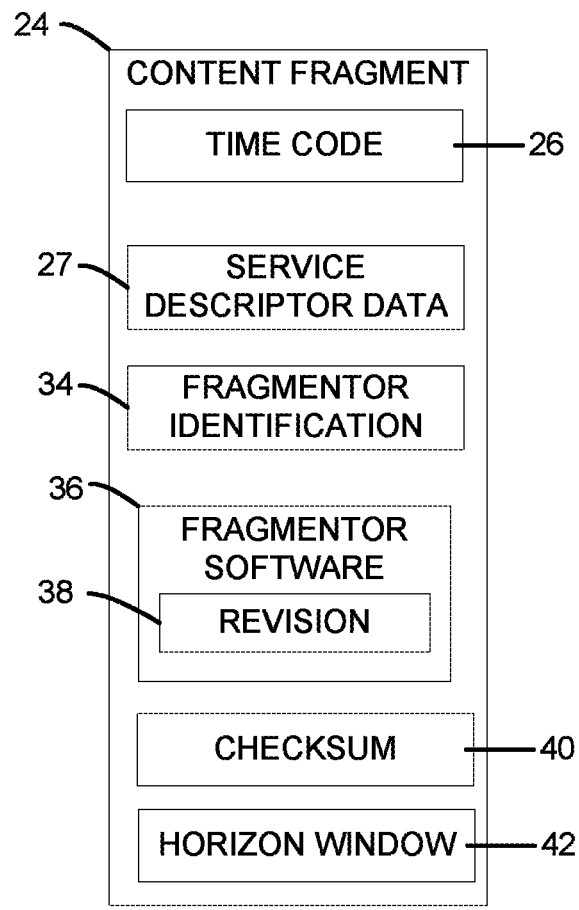
FIG. 3 is a block diagram of an exemplary content fragment that may be constructed from the encoded data stream of FIG. 2.

FIG. 3 is a block diagram illustrating at least a portion of data comprised in an exemplary content fragment 24. In an aspect, the fragmentor information can comprise at least one of the fragmentor identification 34 and the fragmentor software revision 38. In an aspect, the fragmentor 16 can encode the data stream and/or content fragments 24 with fragmentor information. As an example, the fragmentor information can be encoded by the fragmentor 16 into a metadata header of the content fragment 24 such as a MOOF header or 'mfhd' of each of the content fragments 24, for example. The use of a metadata header such as the MOOF header can be beneficial to system performance because the information bits can be part of a video packet and precede the video data where it is not necessary to look further into the video data to discover the encoded information.

In an aspect, the fragmentor information can be encoded by the fragmentor 16 as a custom UUID "box." For example, MPEG-4 part 12 (14496-12) allows a UUID box to be optionally added at each level of an MPEG-4 message. In an aspect, the UUID box can comprise an underlying information associated with a 128-bit number used to uniquely identify the underlying information for subsequent reference and retrieval. As an example, the UUID box can comprise a reference to the network address of the host that generated the UUID, a timestamp (a record of the precise time of a transaction), and a randomly generated component. Because the network address identifies a unique computer, and the timestamp is unique for each UUID generated from a particular host, those two components sufficiently ensure uniqueness. However, the randomly generated element of the UUID can be added as a protection against any unforeseeable problem. As an example, the encoded fragmentor information can allow the processing history, including, without limitation, the fragmentor 16 that processed the fragment, and when the processing occurred, for a content fragment 24 to be identified even after the content fragment has been downloaded to a remote storage device.

In an aspect, the fragmentor 16 can be configured to encode the SDT 27 or similar data as a custom universally unique identifier (UUID) box in the header of the associated content fragment 24. As an example, the SDT 28 can be encoded in a transport header of the data stream by the encoder 14, extracted from the transport header by the downstream fragmentor 16, and encoded into a MOOF header of an associated one of the content fragments 24 by the fragmentor 16.

In an aspect, the fragmentor 16 can be configured to encode an authenticated checksum 40 into at least one of the content fragments 24. As an example, the check sum 40 can be a fixed-size datum computed from an arbitrary block of digital data for the purpose of detecting accidental errors that may have been introduced during its transmission or storage. The integrity of the data can be checked at any later time by recomputing the checksum 40 and comparing it with the stored one. If the checksums match, the data were almost certainly not altered (either intentionally or unintentionally). By way of example, the checksum 40 can be an MD5 checksum or other cryptographic hash function. In an aspect, the checksum 40 can be encapsulated on the MOOF header of at least one of the content fragments 24. By analyzing the checksum 40 in the MOOF header of the content fragment 24, it can be determined whether the content fragments 24 were received with incorrect/malformed/corrupted or hacked MOOFs.

As described in more detail below, a method for processing a data stream can comprise encoding information relating to each of a plurality of content fragments of the data stream for downstream processing of the content stream.

Figure 4:
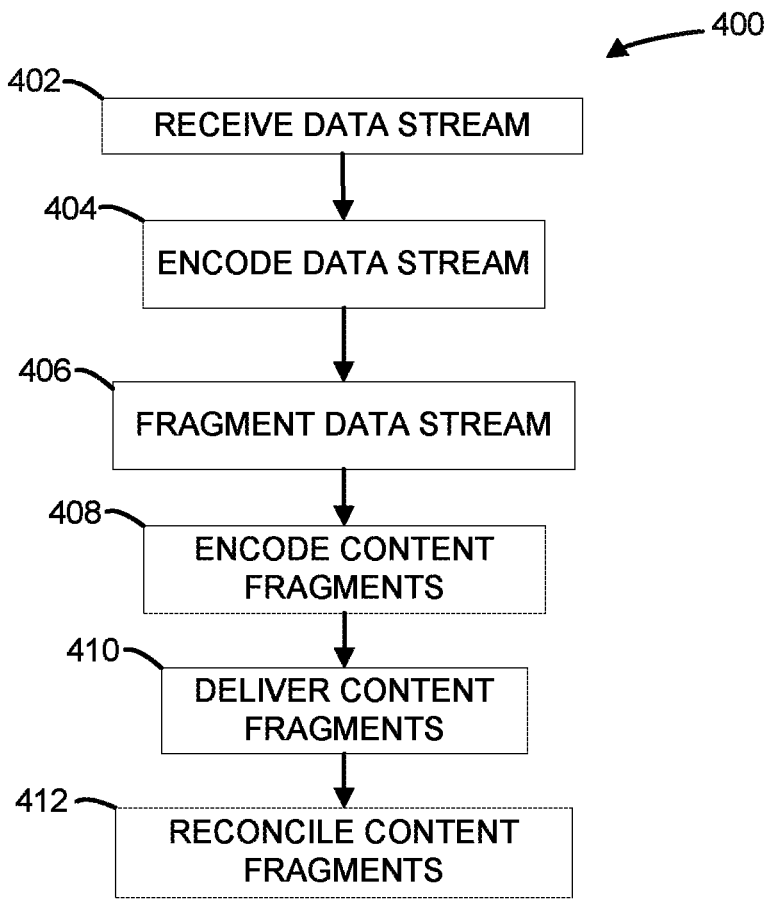
FIG. 4 is a flow chart of an exemplary method for data stream fragmentation.

FIG. 4 illustrates a method 400 of data stream fragmentation. FIG. 4 will be discussed, for illustrative purposes only, with reference to FIG. 1, FIG. 2, and FIG. 3. In step 402, the input 12 can receive the data stream from the data source 17. In step 404, the encoder 14 can receive the data stream from the input 12 and can encode/transcode information onto the data stream(s). By way of example, the information inserted/encoded on the data stream by the encoder 14 can comprise the time code 26, and/or the SDT 28 or similar data, the quality level information 30. As a further example, additional information can be inserted in the data stream by the encoder 14. In step 406, the encoded data stream can be received by the fragmentor 16 to fragment the data stream in response to the encoded information and to define the content fragments 24 of the data stream. By way of example, the fragmentor 16 can be configured to separate or fragment the data stream into each of the content fragments 24 represented by the data stream based at least in part upon at least a portion of an information (e.g., time code 26) encoded onto the data stream by the encoder 14. In an aspect, the fragmentor 16 can encode/encapsulate information onto at least one of the content fragments 24 constructed/defined by the fragmentor 16, as shown in step 408. For example, the fragmentor 16 can insert information into each of the content fragments 24, including the SDT 28, the fragmentor identification 34, the fragmentor software revision 38, and the checksum 40. However, other information can be inserted into at least one of the content fragments 24 by the fragmentor 16. As an example, any of the information inserted by the fragmentor 16 can be included in the SDT 28.

In an aspect, once the content fragments 24 are generated, the content fragments 24 can be distributed to the consumer devices 33 or the client devices, for example, an end-user, client or consumer device, as shown in step 410. In step 412, an end-user device can receive the content fragments 24 and can adaptively select the most appropriate sequence of the content fragments 24 to reconcile the content fragments as a substantially seamless media playback.

As described in more detail below, a method for locating a content fragment can comprise querying a desired fragment by an associated identifier and/or time code, wherein the fragment associated with the identifier or a suitable alternative can be returned to a requesting device.

Figure 5:
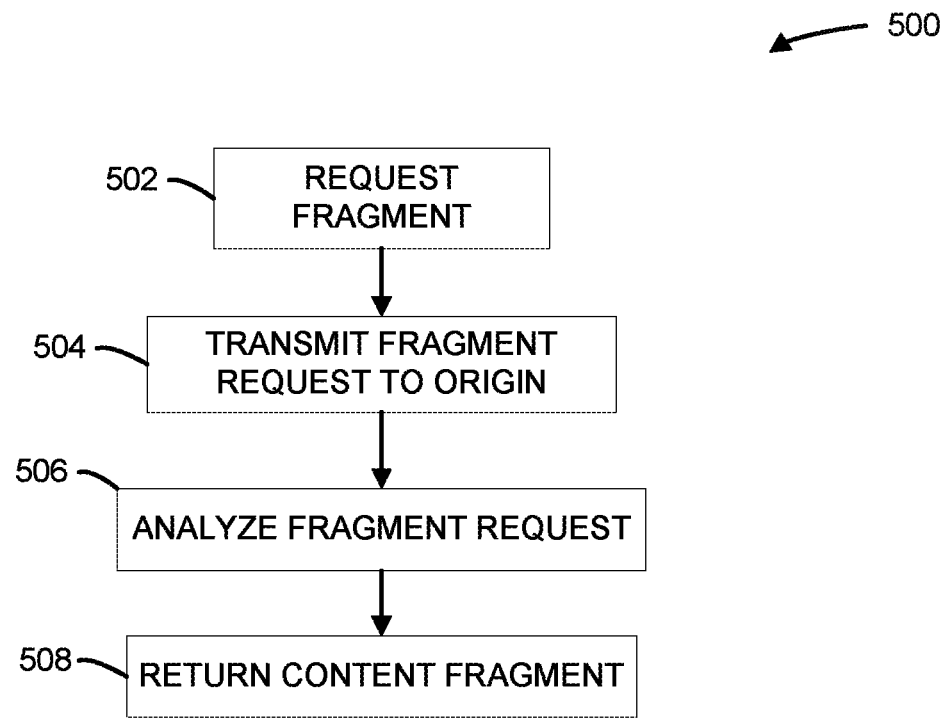
FIG. 5 is a flow chart of an exemplary method of locating a content fragment according to an embodiment.

In an aspect, FIG. 5 illustrates a method 500 of locating a fragment, such as a particular one of the content fragments 24. FIG. 5 will be discussed, for illustrative purposes only, with reference to FIG. 1, FIG. 2, and FIG. 3. In step 502, a user or user device can submit a fragment request to a computing device such as the server 31 or the content distribution network (CDN) 32 associated with distributing the content fragments 24. By way of example, the fragment request can comprise a particular time code associated with one of the content fragments 24 defined by the encoder 14 or fragmentor 16. As an additional example, the fragment request can include a "best guess" of a time code associated with one of the content fragments 24. As a further example, the "best guess" can be determined based upon a difference between a known time value and the time duration between the known time value at the requested content. Other means of approximating a time code for the purposes of requesting one of the content fragments 24 can be used.

In step 504, the fragment request can be propagated or otherwise transmitted through the CDN 32 and to the server 31. As an example, the fragment request can be transmitted to other locations having information relating to the naming convention of each of the content fragments 24.

In step 506, the server 31 (or other device having the requisite information) can analyze the request to extract a time code identified in the fragment request. In step 508, the server 31 can return one of the content fragments 24 having the time code identified in the fragment request. In the event the time code identified in the fragment request is not identical to a time code of one of the content fragments 24, the server 31 can return the one of the content fragments having the time code nearest to the time code identified in the fragment request. In an aspect, each of the content fragments 24 includes a UUID box which contains a name (e.g. time code) of the subsequent one of the content fragments relative to time. Accordingly, once the user receives the content fragment 24 returned by the server 31 using the method 500, the user device can parse out the encoded UUID box which identifies the name of the next one of the content fragments 24 so a duplication of content in the CDN 32 is minimized. As an example a user/device can initiate a fragment request for any time code. As a further example, any user, client, and/or system can initiate a fragment request.

In an aspect, a given content delivery system can have multiple redundant computing devices such as server 31, for example. A user device 33 may be requesting content from a first such server (e.g., server 31) which, during playback, fails. The user device 33 may direct the content request to a second server that contains the same content. Similar to step 508, the second server can attempt to return a content fragment 24 having the time code identified in the fragment request. In the event the time code in the fragment request does not exist in one of the content fragments 24, the second server can return the one of the content fragments having the time code nearest to the time code identified in the fragment request. Because each fragment 24 includes information that identifies the next fragment 24 in the stream, and because the fragments are identified with unique time codes that relate to a common position within the original content, playback will resume for the consumer device 33 at or near the point at which the first server failed, and will continue uninterrupted. In this way, the user will experience a substantially seamless transition in the content being delivered, even though the origin server has changed.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving a content fragment request;
determining, based on the content fragment request, an approximate time code;
determining, based on the approximate time code, a content fragment comprising a time code closest to the approximate time code, wherein the content fragment comprises a universally unique identifier (UUID) that identifies a name of a next content fragment following the content fragment and wherein the content fragment further comprises a quality level of the next content fragment; and
sending, to a distribution network, the content fragment.

2. The method of claim 1, wherein the time code is associated with a beginning of the content fragment.

3. The method of claim 1, wherein the approximate time code comprises an approximation of a time code associated with a desired content fragment.

4. The method of claim 1, wherein the content fragment comprises an identifier of a next in time content fragment.

5. The method of claim 1, wherein the content fragment comprises a horizon window indicating one or more next in time content fragments and the quality level for each next in time content fragment of the one or more next in time content fragments.

6. A method comprising:
receiving, from a first computing device, content;
causing output of the content;
determining an interruption in receiving the content;
sending, to a second computing device based on the interruption, a content fragment request comprising an approximate time code, wherein the content fragment request causes a determination, based on the approximate time code, of a content fragment comprising a time code that is closest to the approximate time code, wherein the content fragment comprises a universally unique identifier (UUID) that identifies a name of a next content fragment following the content fragment and wherein the content fragment further comprises a quality level of the next content fragment; and
receiving, from the second computing device, the content fragment.

7. The method of claim 6, wherein the time code is associated with a beginning of the content fragment.

8. The method of claim 6, wherein the output of the content is continuous during the interruption.

9. The method of claim 6, wherein the approximate time code comprises an approximation of a time code associated with a desired content fragment.

10. The method of claim 6, wherein the content fragment comprises a horizon window indicating one or more next in time content fragments and the quality level for each next in time content fragment of the one or more next in time content fragments.

11. An apparatus comprising:
one or more processors; and
a memory storing processor-executable instructions that, when executed by the one or more processors, cause the apparatus to:
receive a content fragment request;
determine, based on the content fragment request, an approximate time code;
determine, based on the approximate time code, a content fragment comprising a time code closest to the approximate time code, wherein the content fragment comprises a universally unique identifier (UUID) that identifies a name of a next content fragment following the content fragment and wherein the content fragment further comprises a quality level of the next content fragment; and
send, to a distribution network, the content fragment.

12. The apparatus of claim 11, wherein the time code is associated with a beginning of the content fragment.

13. The apparatus of claim 11, wherein the approximate time code comprises an approximation of a time code associated with a desired content fragment.

14. The apparatus of claim 11, wherein the content fragment comprises an identifier of a next in time content fragment.

15. The apparatus of claim 11, wherein the content fragment comprises a horizon window indicating one or more next in time content fragments and the quality level for each next in time content fragment of the one or more next in time content fragments.

16. An apparatus comprising:
one or more processors; and a memory storing processor-executable instructions that, when executed by the one or more processors, cause the apparatus to, receive, from a first computing device, content;

cause output of the content;

determine an interruption in receiving the content;

send, to a second computing device based on the interruption, a content fragment request comprising an approximate time code, wherein the content fragment request causes a determination, based on the approximate time code, of a content fragment comprising a time code that is closest to the approximate time code, wherein the content fragment comprises a universally unique identifier (UUID) that identifies a name of a next content fragment following the content fragment and wherein the content fragment further comprises a quality level of the next content fragment; and receive, from the second computing device, the content fragment.

17. The apparatus of claim 16, wherein the approximate time code is associated with a beginning of the content fragment.

18. The apparatus of claim 16, wherein the output of the content is continuous during the interruption.

19. The apparatus of claim 16, wherein the approximate time code comprises an approximation of a time code associated with a desired content fragment.

20. The apparatus of claim 16, wherein the content fragment comprises a horizon window indicating one or more next in time content fragments and a quality level for each next in time content fragment of the one or more next in time content fragments.

21. The method of claim 1, wherein the time code is derived from a continuously increasing time scale.

22. The method of claim 6, wherein the time code is derived from a continuously increasing time scale.

23. The apparatus of claim 11, wherein the time code is derived from a continuously increasing time scale.

24. The apparatus of claim 16, wherein the time code is derived from a continuously increasing time scale.

* * * * *